(12) United States Patent
Abadia et al.

(10) Patent No.: US 8,336,607 B2
(45) Date of Patent: Dec. 25, 2012

(54) COMPACT ELECTRIC POWER SUPPLY DEVICE FOR A MOTOR VEHICLE

(75) Inventors: Roger Abadia, Neuilly-Plaisance (FR); Daniel Richard, Boussy Saint Antoine (FR); Hugues Doffin, Creteil (FR); Julien Masfaraud, Paris (FR); Richard Tellier, Paris (FR); Matthieu Treguer, Maisons Alfort (FR); Ertugrul Taspinar, Annemasse (FR); Christophe Picod, Gif sur Yvette (FR)

(73) Assignee: Valeo Equipements Electriques Moteur, Creteil (FR)

( * ) Notice: Subject to any disclaimer, the term of this patent is extended or adjusted under 35 U.S.C. 154(b) by 616 days.

(21) Appl. No.: 12/063,706

(22) PCT Filed: Sep. 13, 2006

(86) PCT No.: PCT/FR2006/050882
§ 371 (c)(1),
(2), (4) Date: Apr. 14, 2011

(87) PCT Pub. No.: WO2007/031689
PCT Pub. Date: Mar. 22, 2007

(65) Prior Publication Data
US 2011/0186365 A1 Aug. 4, 2011

(30) Foreign Application Priority Data

Sep. 13, 2005 (FR) ..................................... 05 09359

(51) Int. Cl.
*F28F 7/00* (2006.01)
(52) U.S. Cl. ........................ 165/80.3; 180/68.5; 361/704
(58) Field of Classification Search ................. 180/68.5; 429/61, 62, 72, 32, 120; 62/239, 244, 259.2; 903/907; 320/116; 310/104; 307/9.1, 10.1
See application file for complete search history.

(56) References Cited

U.S. PATENT DOCUMENTS

| 6,094,927 | A | 8/2000 | Anazawa et al. |
| 6,541,942 | B1 | 4/2003 | Francis |
| 7,172,831 | B2 * | 2/2007 | Jaura et al. ................. 429/72 |
| 7,819,172 | B2 * | 10/2010 | Otsuka et al. ............... 165/80.3 |
| 2009/0176149 | A1 * | 7/2009 | Tsukamoto et al. .......... 429/120 |

* cited by examiner

*Primary Examiner* — J. Allen Shriver, II
*Assistant Examiner* — James Triggs
(74) *Attorney, Agent, or Firm* — Berenato & White, LLC (57) ABSTRACT

The invention concerns an electric power supply device (10) for a motor vehicle, which is mounted in the motor vehicle and is designed to connect at least one electrical machine (12) capable of operating as an electric engine and/or an electric generator, to a battery (16) of the vehicle, comprising a single housing (32) including cooling means and having a lower part (34) forming a box for receiving at least one electric power storage unit (20).

21 Claims, 8 Drawing Sheets

COMPACT ELECTRIC POWER SUPPLY DEVICE FOR A MOTOR VEHICLE

CROSS-REFERENCE TO RELATED APPLICATIONS AND CLAIM TO PRIORITY

This application relates to International Application No. PCT/FR2006/050882 filed Sep. 13, 2006 and French Patent Application No. 0509359 filed Sep. 13, 2005, of which the disclosures are incorporated herein by reference and to which priority is claimed.

FIELD OF THE INVENTION

The invention concerns an electrical supply device for a motor vehicle.

The invention concerns more particularly an electrical supply device for motor vehicle that is intended to connect at least one electrical machine, able to function as an electric motor and/or as an electrical generator, to a battery of the vehicle, and that comprises at least one electronic converter.

BACKGROUND OF THE INVENTION

Many examples of devices of this type are known.

Such electrical supply devices are for example used for supplying electrical machines of motor vehicles of the electrical and/or hybrid type, that is to say combining an electrical machine and a conventional thermal engine, for which it is important to be able to recover the kinetic energy in order to recharge the vehicle battery and supply the onboard system with electrical power. This function is normally referred as recuperative braking. A battery of the metal hydride type is for example used.

These electrical supply devices do however pose many problems.

This is because the energy storage units undergo numerous charging and discharging cycles. For example, when the motor vehicle stops, a very intense discharge of electricity occurs. For example again, the storage units are charged with a high-intensity electric current during periods of recuperative braking.

When electric current is released, during discharge operations, or stored during charging operations, the storage units give off heat. The quantity of heat given off is proportional to the intensity of the electric current flowing in charge or discharge mode.

In addition, these charging and discharging cycles are liable to follow each other at a very high rate, in particular when the vehicle is travelling in town and the driver is caused to stop and restart the vehicle frequently.

However, so that the storage units can effectively store the electric current, they must be maintained within a range of operating temperatures that is bounded by a maximum operating temperature and a minimum operating temperature.

When the charging and discharging cycles follow each other rapidly, the temperature of the storage units is liable to rise very quickly beyond the maximum operating temperature. The temperature rise of the storage units is all the greater when the storage units are arranged in a closed box.

SUMMARY OF THE INVENTION

To remedy all these drawbacks, the invention proposes an electrical supply device for a motor vehicle of the type described previously and mounted in the said motor vehicle, characterised in that it comprises a single casing containing cooling means and comprising a bottom part forming a box for receiving at least one electrical energy storage unit.

By virtue of the invention the energy storage unit is well cooled.

In addition, by virtue of the cooling means it is possible to mitigate other drawbacks.

This is because the various elements that make up these supply devices, such as the electronic converter such as an inverter and the battery, are generally located in different places in the vehicle and are connected together by connection cables.

The consequence of these distant connections is the appearance of connection inductances, in particular between the inverter and the battery, which produce voltage ripples and resonance between the various elements and earth shifting for the signals to be communicated between the various items of equipment.

Moreover, these distant connections also pose the problem of filtering of parasitics.

To remedy these drawbacks it is proposed that the single casing groups together all the elements that make up the electrical supply device.

Thus it is proposed that the electrical supply device comprises the single casing comprising cooling means and in which at least the electronic converter or converters and at least one electrical energy storage unit are arranged.

Thus the energy storage unit will replace the battery in order to make recuperative braking. Therefore there is no longer any concern about the connection inductance between the battery and the inverter. And in addition, grouping together all the components of the supply device, in a single casing with the storage unit, reduces the connection inductances that exist between the said unit and the electronic converter or converters, whilst ensuring grouped cooling of electronic converter or converters and electrical energy storage unit or units.

According to other non-limitative characteristics of the invention taken in isolation or in combination:
the casing comprises:
  a bottom part, forming a box receiving a plurality of electrical energy storage units,
  at least one top part, fitting on top of the bottom part, each bottom or top part comprising associated cooling means,
  the top part receives at least one electronic control card and at least one electronic power card that comprises the electronic converter or converters.
This allows facilitated assembly and good compactness of the device.
  the bottom part has the form of a first substantially parallelepipedal box, open at its top end, which receives, in the direction of the length or width or height, at least two electrical energy storage units known as "supercapacitors" connected in series, and which comprises a bottom cooling means.
  The energy storage units are disposed in stages, the units of a first stage being offset with respect to the second stage so that two units in the second stage are in tangential contact with the same unit in the first stage.
  the top part comprises a second box that fits on the top end of the first box, which is open at its top end, and which is intended to receive successively, from the bottom to the top of the second box, the electronic control card, an isolation seal, and the electronic power card comprising the electronic converter, and a cover that fits on the top end of the second box and that comprises top cooling means, This allows good cooling of the device during its functioning.

- the bottom/top cooling means of at least one bottom/top part are fluid cooling means.
- the electrical energy storage units are embedded in a heat-regulating material such as in particular paraffin
- to form the bottom cooling means, the first box of the bottom part comprises longitudinal walls, in the thickness of which there are arranged a plurality of longitudinal conduits intended to have a cooling fluid pass through them, and transverse walls in the thickness of each of which there is formed a cavity that communicates at least:
  - with all the associated ends of the conduits in the longitudinal walls,
  - with a first associated conduit supplying or discharging the cooling fluid, a nozzle of which projects on the external face of each transverse wall,
- to form the top cooling means, the cover of the top part comprises in its thickness a longitudinal and transverse cavity that is intended to have the cooling fluid pass through it and that communicates at its ends with second associated cooling fluid supply and discharge conduits,
- each cavity in each transverse wall of the first box of the bottom part communicates with a third conduit that communicates with the second associated conduit of the cover of the top part, to allow unique supply and discharge of the conduits of the bottom part and the cavity of the cover by means of the nozzles of the bottom part.
- the third conduit communicates with the second conduit by means of a tube,
- the tube is independent and is received in a firstly directly in a bore in the first box forming the third conduit and secondly in a sleeve made from elastomer material received in a bore in the cover forming the second conduit in particular in order to provide imperviousness to the cooling fluid under pressure,
- the bottom/top cooling means of at least one bottom/top part are air cooling means, This facilitates the integration of the device (no connection to a dedicated circuit such as a cooling circuit of the vehicle).

- to form the bottom cooling means, the first box of the bottom part comprises opposite transverse walls that each comprise an air passage, the opposite air passages allowing a flow of air to pass through the box in order to cool the energy storage units connected in series, and at least one air passage in one of the transverse walls is composed of an opening formed in the said transverse wall to which an air circulation bell is joined, an internal cavity of which received internally at least one powered fan and an external conduit of which is intended to be connected to a fresh air inlet conduit for the associated vehicle,
- in order to form the top cooling means, the cover on the second box of the top part comprises a plurality of fins and at least one edge of the internal cavity of the circulation bell projects at the top end of the fins in order to permit a flow of air to at least partially pass over the fins, This maximises the exchange surface in a restricted volume in order to optimise the thermal dissipation.

- a flap projecting horizontally from the second box extends inside the cavity of the circulation bell in order to guide the air between the powered fan and the fins,
- only one of the air passages of the transverse walls receives an air circulation bell and the opposite transverse wall comprises an air discharge grille,
- the two air passages of the opposite transverse walls are each composed of an opening to which is abutted an air circulation bell that is provided with at least one powered fan respectively blowing or sucking, one edge of the internal cavity of each bell extending opposite the fins and an external conduit being intended to be connected to a fresh-air inlet or hot-air discharge conduit of the associated vehicle in order to supply or discharge the air in the bottom box and between the fins,
- a guide wall extends above the ends of the fins in order to guide the air flow between the fins,
- the box comprises two electronic converters.
- at least one electronic converter is an inverter.

This reduces the connection inductances between the inverter and the storage units. In addition, this makes it possible to avoid having interference in the supply device and on the onboard system of the vehicle if the inverter is an inverter with chopping technology known as PWM (Pulse Width Modulation).

- at least one electronic converter is a DC to DC converter,

This reduces the connection inductances between the inverter and the said converter.

- the casing also comprises a two-position switch,

This reduces the connection inductances between the inverter and the energy storage unit.

- the casing is in particular substantially of the size of a standard motor vehicle battery, This makes it possible to put the casing at the same location as the conventional battery, the latter being able for example to be put in the boot. Thus this makes it possible to integrate electrical machine and electrical supply device as close as possible, which reduces the lengths of wiring connecting them.

- the casing is produced by casting an aluminium alloy.

BRIEF DESCRIPTION OF THE DRAWINGS

Other characteristics and advantages will emerge during a reading of the following detailed description, for an understanding of which reference should be made to the accompanying drawings, among which.

DESCRIPTION OF THE PREFERRED EMBODIMENTS

In the following description, identical reference numbers designate identical parts or those having similar functions.

Figure 1:
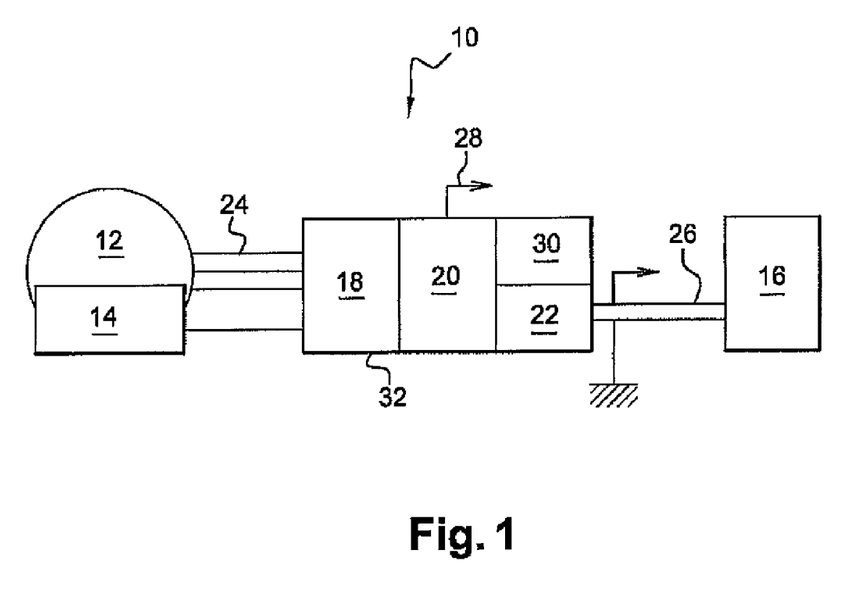
FIG. 1 is an outline diagram of an electrical device according to the invention.

FIG. 1 depicts the whole of an electrical supply device 10 for a motor vehicle produced in accordance with the invention.

The device 10 is intended to connect at least one electrical machine 12 provided with sensors 14, capable of functioning as an electric motor, for example in order to drive at least one wheel of the vehicle and/or as an electrical generator for example to recover the kinetic energy of the vehicle during braking, to a battery 16 of the vehicle. This machine, such as an alternator starter, is said to be reversible. This machine is taken as a non-limitative example for the remainder of the description.

For the record it should be stated that an alternator starter is a reversible alternator making it possible firstly to convert mechanical energy into electrical energy when it is functioning in electrical generator mode in order in particular to recharge a battery and/or to supply the consumers of at least one onboard system of the motor vehicle and secondly to convert electrical energy into mechanical energy when it is functioning in electric motor mode, referred to as starter mode, in order in particular to start the internal combustion engine or thermal engine of the motor vehicle and, in one embodiment, to prevent the thermal engine stalling. This alternator starter comprises current rectification means referred to as an inverter comprising for example transistors of the MOSFET type controlled by an electronic actuation and control unit as described for example in the documents FR A 2 745 444 and FR A 2 745 445.

This electronic actuation and control unit receives signals coming from sensors for the angular position of the rotor of the machine and also comprises controllers, referred to as drivers, which are power elements and control the transistors of the MOSFET type. These drivers, in one embodiment, belong to a power stage also comprising the transistors of the MOSFET type of the inverter constituting a reversible alternating to direct current electrical converter, referred to as "AC/DC", in electrical generator mode. In electric motor mode the MOSFET transistors of the inverter are controlled in two-state mode in order to control, in full wave, the windings of the stator of the machine or in a variant by a variable pulse width control, that is to say a chopping technology called PWM (Pulse Width Modulation).

The control elements belong to a control stage of lower power.

In one embodiment the power stage comprises an electronic power card carrying the power elements, such as the MOSFET-type transistors and the drivers, and the control stage comprises an electronic control card carrying the control elements. In these aforementioned documents the alternator starter is polyphase and belongs to an arrangement for a motor vehicle comprising at least two electrical energy storage units. One of these storage units is a battery and the other a supercapacitor, that is to say a high-value capacitor referred to as an ultracapacitor. It should be noted that, in starter mode (functioning in electric motor mode), the arrangement makes it possible to supply the alternator starter with a voltage greater that that in generator mode.

This type of arrangement makes it possible to recover energy during braking and comprises two electrical distribution networks, at least one switch or one circuit with two switches and a DC to DC converter, referred to as a DC/DC converter, for converting voltages and functioning at two different voltages.

For more information reference should be made to these documents, knowing that the inverter is an electronic current converter.

Naturally the arrangement uses a rotary electrical machine such as a simple alternator electrically connected to a battery. In one embodiment this alternator is associated with a starter connected in parallel with the alternator between a first terminal connected to earth and a second terminal connected to a circuit making it possible in one embodiment to put two batteries in series, for example 12V, to supply the starter with 24V on starting and to put these two batteries in parallel after the starting of the motor vehicle. The device 10 therefore comprises at least one electronic converter 18, 22, 30 and an electrical energy storage unit 20. This device comprises two electrical systems, one dedicated to power (the storage units 20 being in series and adapted to the recovery of energy, the other dedicated to energy in order in particular to recharge the battery 16 connected to the onboard system of the vehicle and/or supply this onboard system.

In a first non-limitative embodiment, the device 10 comprises a DC to DC voltage converter 22.

In a second non-limitative embodiment, the device 10 comprises an inverter 18. The inverter is a reversible DC/AC converter. It functions as an AC/DC converter when the machine is in electrical generator mode (it is often referred as a bridge rectifier), and as a DC/AC converter when the machine is in electric motor mode.

In a third non-limitative embodiment, the device 10 comprises an inverter 18 and a DC to DC converter 22.

In a fourth embodiment, in the non-limitative example embodiment depicted in FIG. 1, the device 10 comprises three electronic converters, namely an inverter 18, a DC to DC converter 22 and in addition a two-position switch 30 or two switches that are connected together by power connections such as bus-bars (not shown).

In a fifth embodiment the device has no electronic converter, inverter and electronic card, the top part 36 forming a simple cover.

The inverter 18, in the aforementioned manner, is a reversible alternating current to direct current electric converter, referred to as "AC/DC" in electrical generator mode or direct to alternating, referred to as "DC/AC", in electric motor mode.

The DC to DC converter 22 makes it possible in particular to convert a voltage on the energy storage unit 20 side, the said voltage being situated in a range of values, here non-limitatively between 6V and 35V, into a voltage compatible with that the battery 16, the battery supplying an onboard system for example of around 12 volts.

The two-position switch 30, or the two switches, for its part makes it possible to determine the operating mode of the electrical machine 12.

In the example taken, the generator mode comprises two phases: a so-called alternator phase and a so-called energy recovery phase, the motor mode comprises a starting phase and a dynamic assistance phase.

The operating mode of the machine with a two-position switch is as follows:
 the switch connects the inverter 18 and the storage unit 20 in motor mode, and in the energy recovering phase,
 the switch connects the inverter 18 and the battery 16 in alternator phase.

It should be noted that, in another embodiment, no switch exists.

The device 10 is for this purpose connected by cables 24 to the electrical machine, by cables 26 to the battery, and by cables 28 to an electrical supply system of the vehicle.

The device 10 making it possible to recover the kinetic energy of the vehicle by means of the electrical machine, this architecture is more particularly known as "14+X" architecture.

As illustrated by FIGS. 1 to 8, the device 10 is mounted in the motor vehicle and comprises a single casing 32, comprising cooling means, in which the energy storage unit or units 20 are arranged.

In this casing installed in the vehicle there are also arranged the electronic 18, 22, 30 and electrical converter or converters in particular for:
reducing the lengths of the connections between these components, so as to limit the effects of the connection inductances,
offering a grouped cooling of the electronic converters 18, 22, 30 and the electrical energy storage unit or units 20.

In general terms, the casing 32 comprises a bottom part 34, forming a box 34 for receiving a plurality of electrical energy storage units 20.

This bottom part 34 is supplemented by at least one top part 36, fitting on top of the bottom part 34, and receiving at least one electronic control card 38 and at least one electronic power card 40 that comprises the electronic converter or converters 18, 22, 30, that is to say the inverter 18, the DC to DC converter 22 and the two-position switch 30.

According to one characteristic the bottom part 34 comprises cooling means for cooling at least one energy storage unit 20.

Preferentially, each bottom 34 or top 36 part comprises associated cooling means.

More particularly, the bottom part 34 is in the form of a first substantially parallelepipedal box, open at its top end 42, which receives at least two electrical energy storage units 20 known as "supercapacitors" or ultracapacitors mounted in series.

In a first non-limitative example embodiment, the storage units are arranged in the direction of the length.

In a second non-limitative embodiment, the storage units are arranged in the direction of the width.

In a third non-limitative embodiment, the storage units are arranged in the direction of the height.

According to the dimensions of the storage units 20, the best arrangement of the three modes for optimising the space necessary for the electronic components integrated in the casing will be chosen, here in the example in the direction of the height.

In a first variant applicable to the three modes, the energy storage units 20 are disposed in stages, the units of a first stage being offset with respect to the second stage so that two units in the second stage are in tangential contact with the same units in the first stage. The contact may be direct or indirect.

In a second variant applicable to the three modes, as depicted in FIGS. 2 to 8, the bottom part receives axial alignments 44 of electrical energy storage units 20 that are arranged in the direction of the length, but this arrangement is not limitative of the invention. The alignments 44 of electrical energy storage units 20 could in fact be arranged in the direction of the width. The energy storage units of two adjacent alignments are held by holding means 46. Any embodiment of these holding means can be suitable for the correct implementation of the invention. In the figures, the holding means are composed of elastic collars 46, but they could be forms integrated with the bottom part 34, or electrical energy storage units 20 themselves, each of these then comprising nesting means intended to cooperate with the adjacent unit 20.

Figure 2:
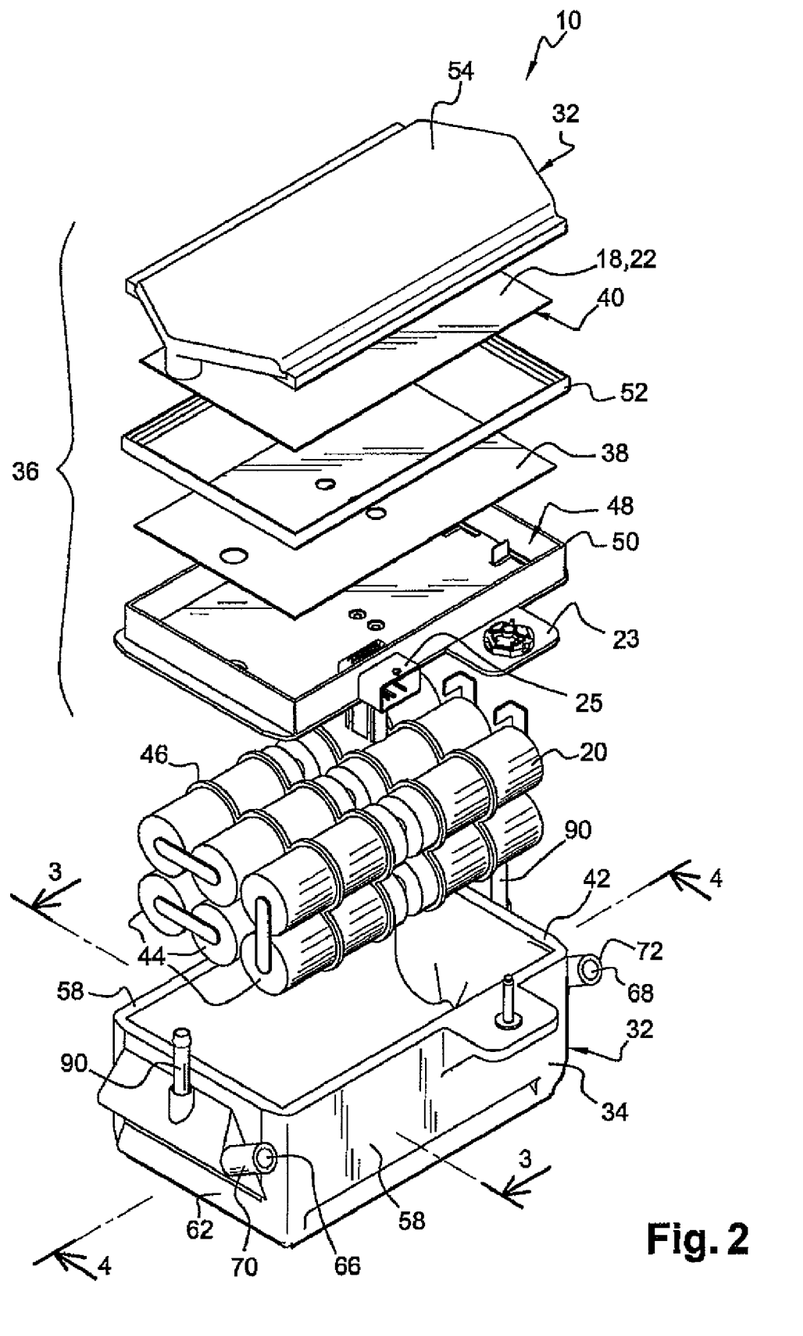
FIG. 2 is an exploded view in perspective of a first embodiment of an electrical supply device according to the invention.

The units 20 have, in the embodiment in FIG. 2, a roughly cylindrical shape with a circular cross section.

Naturally in a variant these elongate-shaped units 20 have another cross section, for example polygonal in shape, such as a hexagonal cross section.

In a variant the cross section is oval.

The first box of the bottom part 34 comprises, according to one characteristic, associated bottom cooling means.

As for the top part 36, this comprises a second box 48 that fits on top of the top end 42 of the first box 34.

This second box can in particular carry external connectors, for example a connector 23 intended to receive control signals and a connector 25 intended to receive an electrical power supply.

The second box 48 is open at it top end 50 and is intended to receive successively, preferentially, from the bottom to the top of the box 48, the electronic control card 38, an insulation seal 52, and the electronic power card 40 comprising the inverter 18 and the DC to DC converter 22, and a cover 54 that fits on top of the top end 50 of the second box 48. This cover 54 comprises top cooling means. Preferentially the power card 40 is disposed as close as possible to the top cooling means. Thus this arrangement avoids heating the storage units 20 by the heat given off by the power card.

Figure 3:
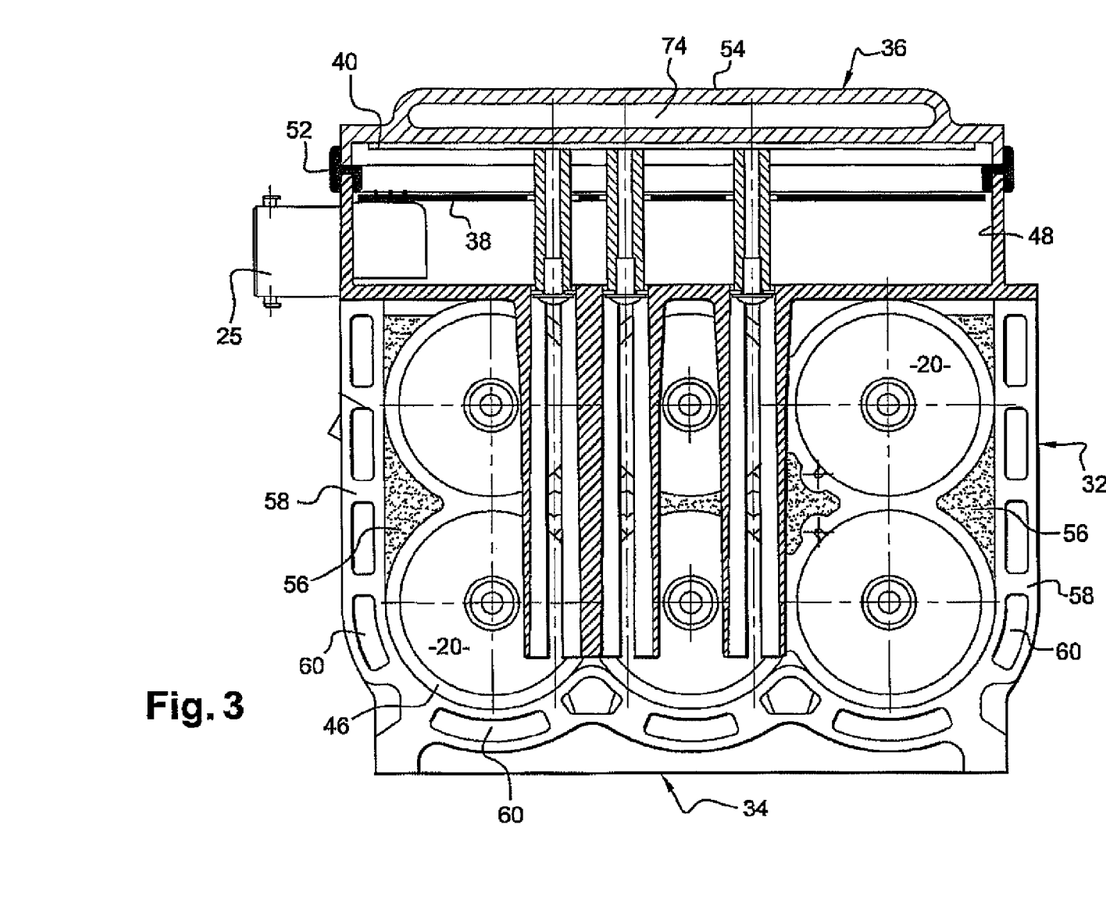
FIG. 3 is a view in section through the plane 3-3 in FIG. 2 of the device in FIG. 2.
Figure 4:
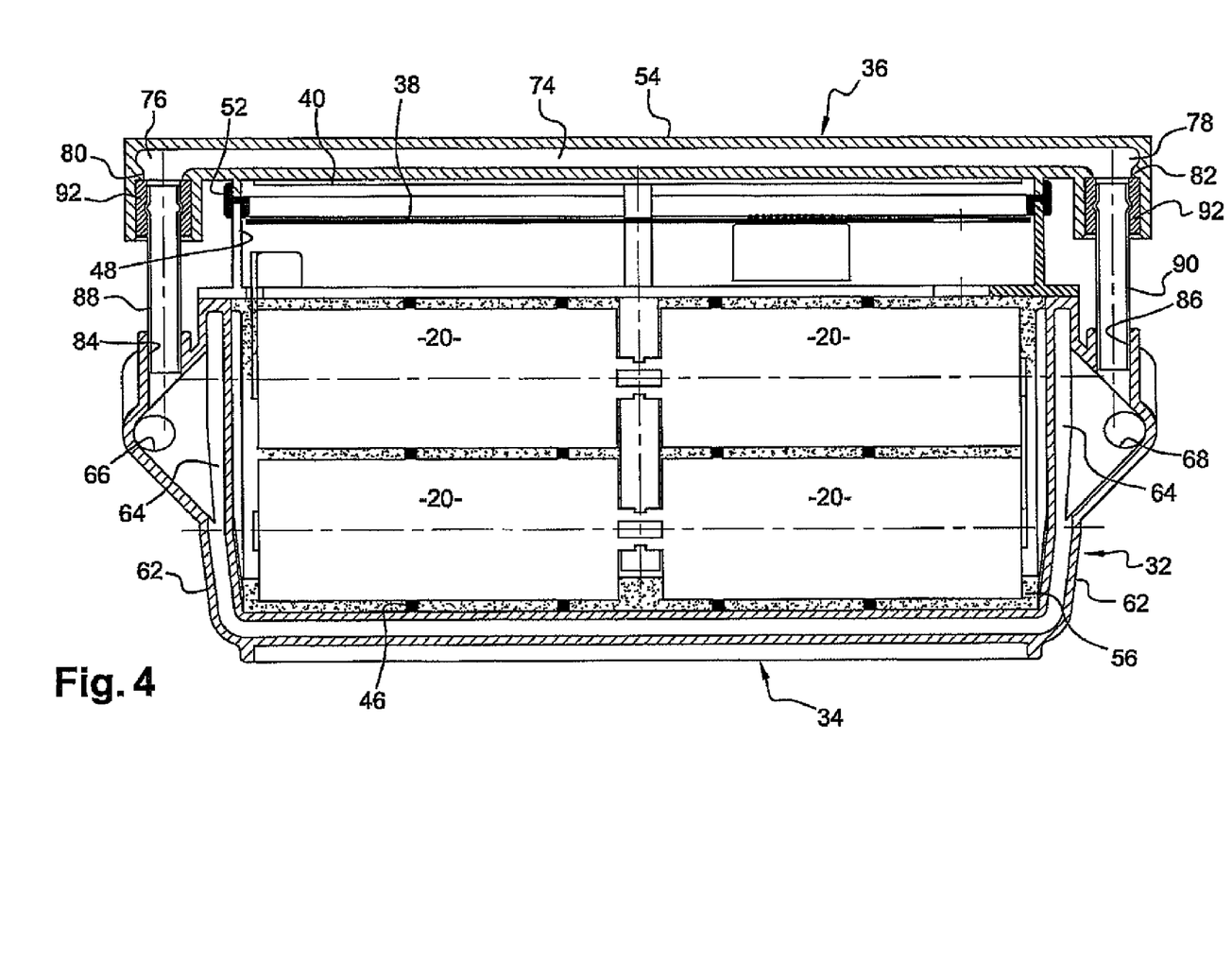
FIG. 4 is a view in section through the plane 4-4 in FIG. 2 of the device in FIG. 2.

According to a first embodiment of the casing 32 depicted in FIGS. 2 to 4, the bottom/top cooling means of at least one bottom 34 or top 36 part are means of cooling by fluid, for example a liquid such as water with glycol or by another example, or air.

In addition, in order to even out the temperature of the storage units 20, and to improve the heat exchange between the said units and the cooling means so as better to dissipate the heat, as illustrated more particularly by FIGS. 3 and 4, the electrical energy storage units 20 are according to one characteristic embedded in a heat regulating material 56 such as in particular paraffin.

Thus this makes it possible to improve better thermal conduction towards the fluid circulation zones. In addition this makes it possible to better cool the rotary electrical machine in electric motor mode, in particular when it is overexcited in the energy recovering phase. In addition, this makes it possible to improve the sealing of the storage units 20.

Here use is made of the latent heat of the heat-regulating material 56, such as paraffin, resulting from its change of state (solid-liquid in the case of paraffin) without simultaneous change of temperature. The paraffin, in general terms heat-regulating material, therefore serves to store the heat and to limit overheating around a temperature varying slightly. Thus, at its change-of-state heat, paraffin liquefies, absorbing large quantities of latent heat, which it then restores when it solidifies when the temperature drops below this change-of-state temperature.

This drop is caused in particular by the bottom cooling means.

Temperature peaks are thus avoided.

Naturally it is possible to use, in another embodiment, another material having these properties. For example it is possible to use a liquid substance of the aqueous type that changes from the liquid state to the gaseous state.

In order to form the bottom cooling means, the first box of the bottom part 34 comprises (FIG. 3) vertical and horizontal walls 58, in the thickness of which there are arranged a plurality of longitudinal conduits 60 positioned so as to optimise the heat exchange coefficient and intended to have the cooling fluid pass through them. In the example, the conduits are parallel.

The first box of the bottom part 34 also comprises vertical transverse walls 62 (FIG. 4) in the thickness of each of which there is formed a cavity 64 that communicates at least:
with all the associated ends of the conduits 60 in the vertical/horizontal longitudinal walls 58,
with a first associated supply conduit 66 or a first conduit 68 discharging the cooling fluid, an associated nozzle 70, 72 of which projects, as illustrated in FIG. 4, on the external face of each transverse wall 62.

In addition, as illustrated in FIG. 4, in order to form the top cooling means, the cover 54 of the top part 36 comprises in its thickness a longitudinal and transverse cavity 74 that is intended to have the cooling fluid pass through it and that communicates at its ends 76, 78 with second associated conduits 80, 82 supplying and discharging the cooling fluid.

The supply and discharge of cooling fluid to the bottom 34 and top 36 parts could be independent. However, in the preferred embodiment of the invention, these two parts 34, 36 are supplied in a common fashion.

To this end, as illustrated in FIG. 4, each cavity 64 in each transverse wall of the first box of the bottom part 34 communicates with a third associated conduit 84, 86, which communicates with the second associated conduit 80, 82 of the cover 54 of the top part 36, to allow a unique supply and discharge of the conduits 60 of the bottom part 34 and of the cavity 74 of the cover 54 by means of the nozzles 70, 72 of the bottom part 34.

Any method of putting in communication the second conduit 80 and third conduit 84 on the one hand and the second conduit 82 and third conduit 86 on the other hand can be envisaged without changing the nature of the invention.

However, preferably, each third conduit 84, 86 communicates with the associated second conduit 80, 82 by means of an associated tube 90, 88.

Each tube 90, 88 could be made in one piece with the cover 54 or with the bottom part 34. However, to facilitate the adjustment of these elements having regard to the dimensional manufacturing dispersions, each tube 90, 88 is independent.

More particularly, as illustrated in FIG. 4, each tube 90, 88 is preferentially received on the one hand directly in an associated bore in the first box 34 forming the third conduit 84, 86 and on the other hand in an associated sleeve 92 made from elastomer material that is received in a bore in the cover 54 forming the second conduit 80, 82.

This configuration in particular ensures perfect impermeability to the pressurised cooling fluid.

Figure 7:
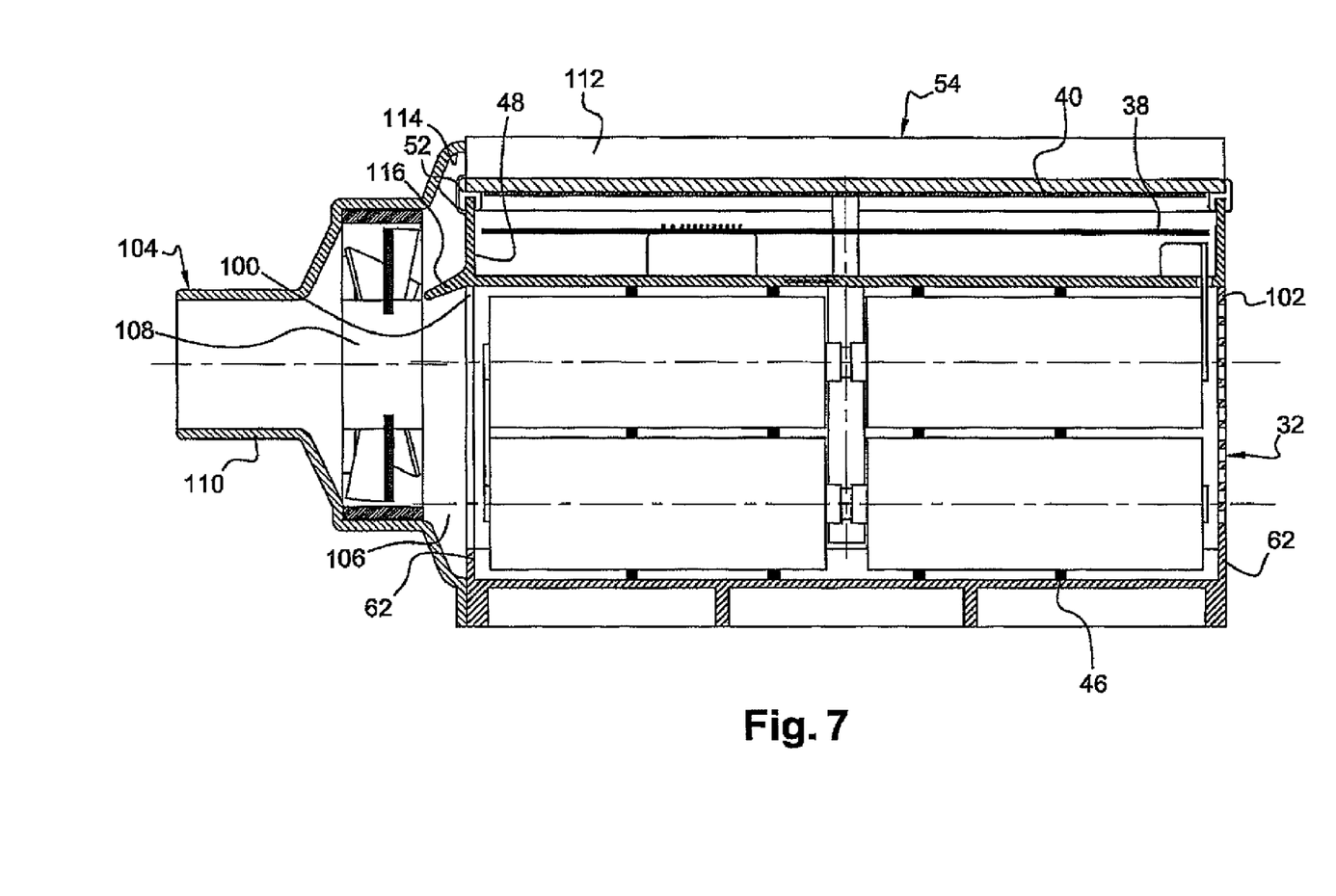
FIG. 7 is a view in section through the plane 7-7 in FIG. 5 of the device of FIG. 5.
Figure 8:
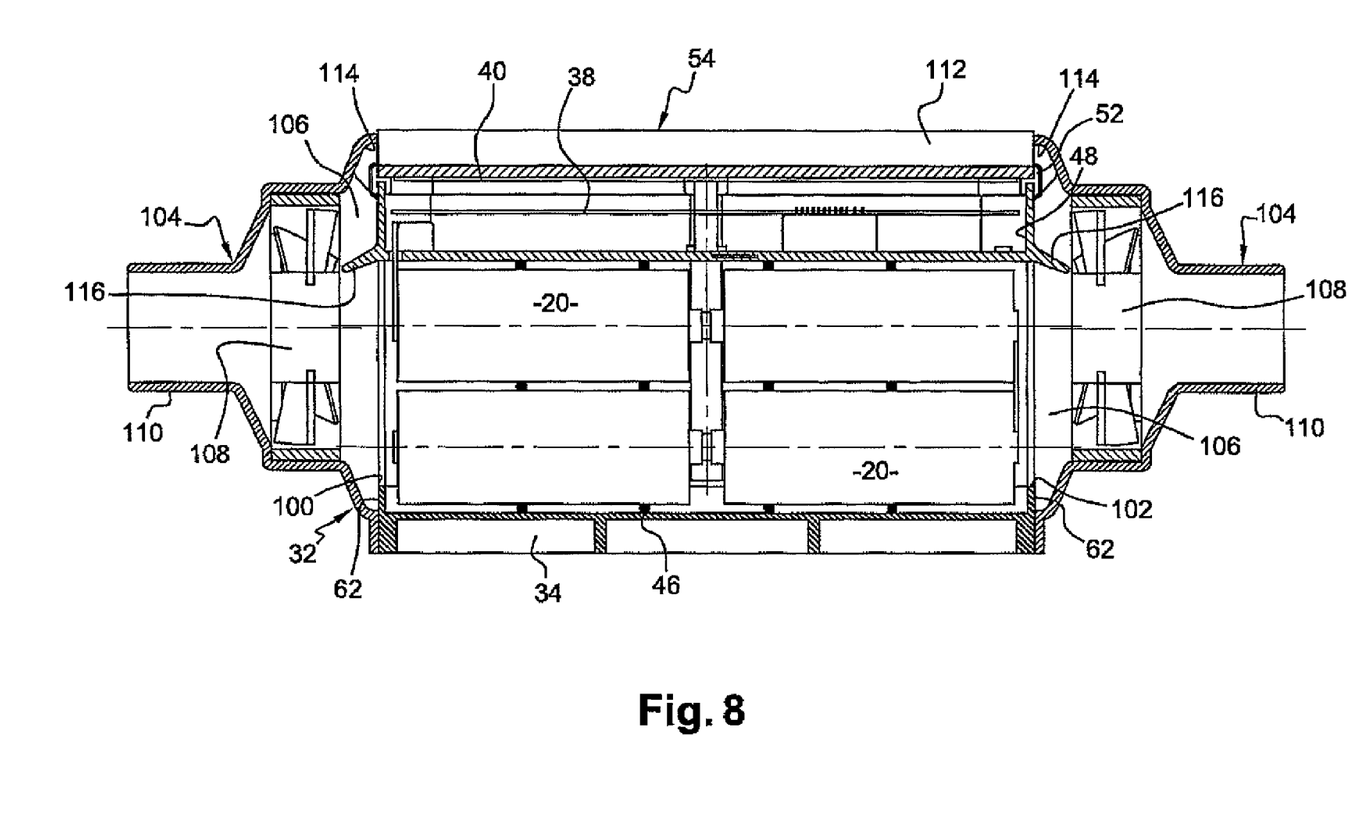
FIG. 8 is a view in section through the plane 7-7 in FIG. 5 of a device as a variant of the second embodiment of the device in FIG. 5.

According to a second embodiment depicted in FIGS. 5 to 8, the bottom/top cooling means of at least one bottom 34 or top 36 part are air cooling means. These means comprise a power fan 108 mounted in a bell 104 (FIGS. 7 and 8).

To this end, in order to form the bottom cooling means, the first box of the bottom part 34 comprises opposite vertical transverse walls 62 that each comprise an air passage 100, 102, the opposite air passages 100, 102 allowing an air flow to pass through the box of the bottom part 34 in order to cool the energy storage units 20 connected in series.

At least one air passage 100 in one of the vertical transverse walls is composed of an opening formed in the said vertical transverse wall 62, to which there is abutted an air circulation bell 104, an internal cavity 106 of which receives internally at least one power fan 108 and an external conduit 110 of which is intended to be connected to a fresh-air inlet conduit (not shown) for the associated vehicle.

Moreover, as illustrated by FIGS. 7 and 8, in order to form the top cooling means, the cover 54 of the second box 48 of the top part 36 comprises a plurality of fins 112, for example parallel, of longitudinal orientation and of a given height, and at least one edge 114 of the internal cavity 106 of the circulation bell 104 projects at the top end of the fins 112 to allow an air flow to at least partially pass over the fins 112.

The cover 54 is fixed to the bottom part, for example by screws 131. This cover 54 is in one embodiment metal, for example made from aluminium, in order better to discharge the heat.

Preferably, in order to limit the air turbulence directed over the fins, a flap 116 projecting horizontally from the second box 48 extends inside the cavity 106 of the circulation bell 104 in order to guide the air between the power fan 108 and the fins 112.

It is possible to envisage at least two variants of the air cooling means 14.

Figure 5:
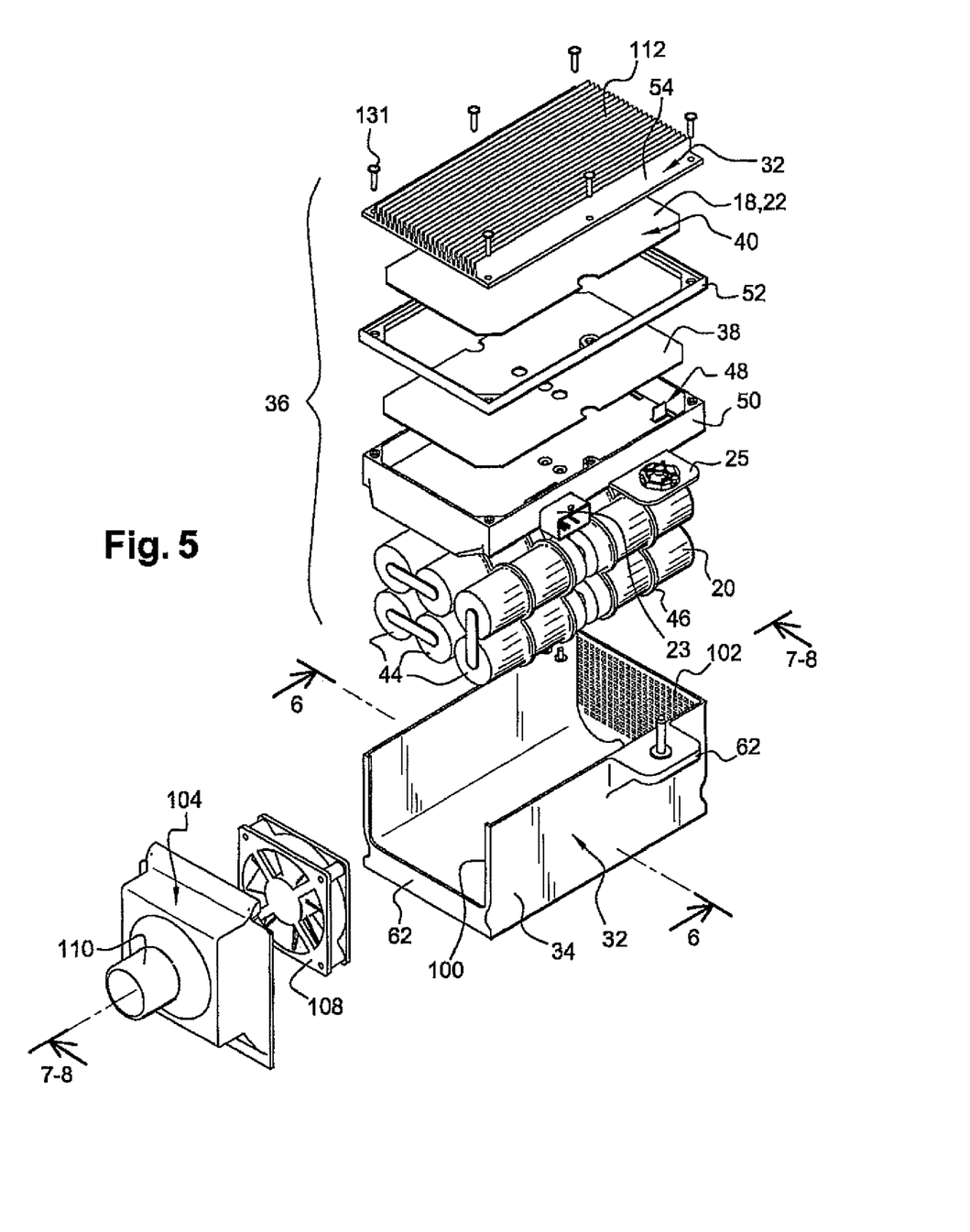
FIG. 5 is an exploded perspective view of a second embodiment of an electrical supply device according to the invention.
Figure 6:
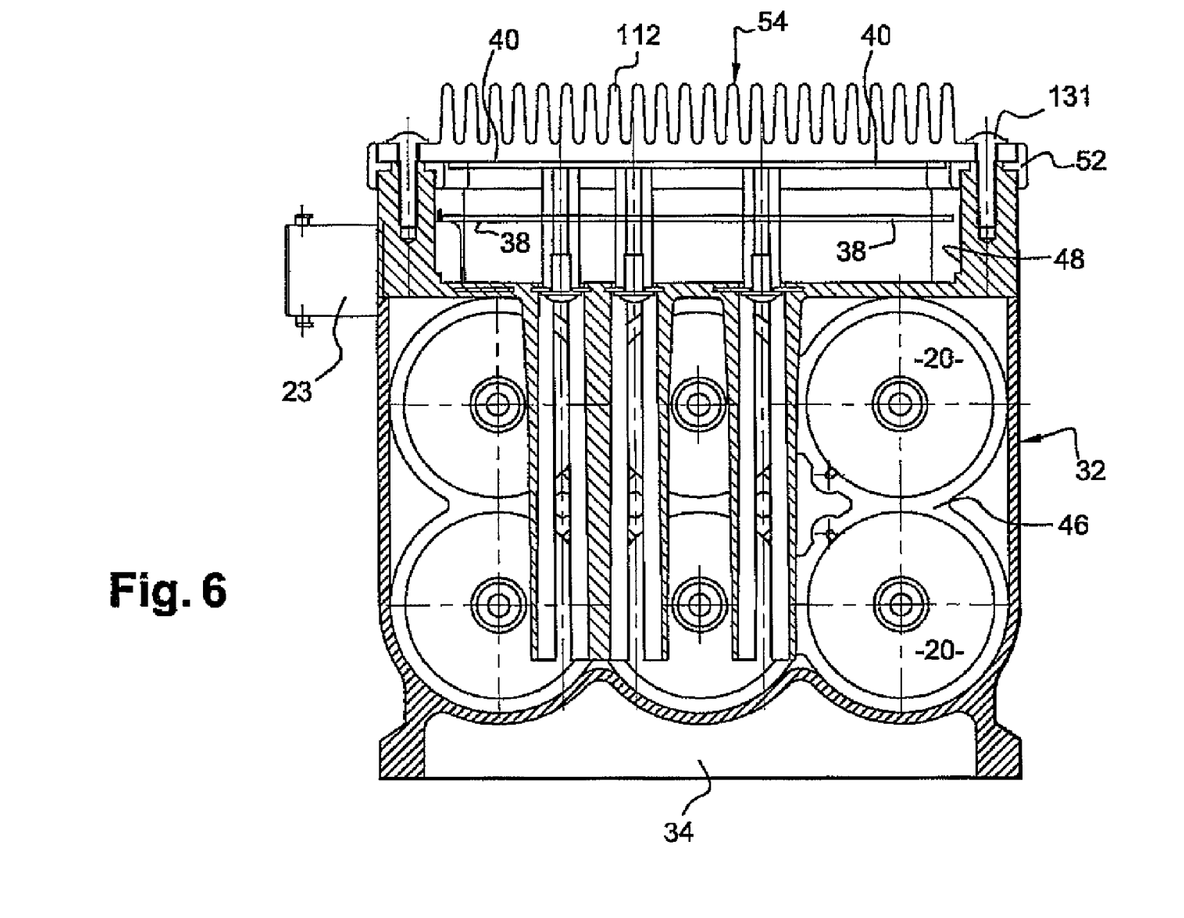
FIG. 6 is a view in section through the plane 6-6 in FIG. 5 of the device of FIG. 5.

According to a first variant of the second embodiment depicted in FIGS. 5 and 7, only one of the air passages 100 of one of the transverse vertical walls 62 receives an air circulation bell 104 and the opposite vertical transverse wall 62 comprises an air discharge grille.

According to a first variant of the second embodiment depicted in FIG. 8, the two air passages 100 and 102 of the opposite vertical transverse walls 62 are each composed of an opening to which there is abutted an air circulation bell 104 that is provided with at least one power fan 108 respectively blowing or sucking, one edge 114 of the internal cavity 106 of each bell 104 extending opposite the fins 112 and an external conduit 110 being intended to be connected to a fresh-air inlet or hot-air discharge conduit (not shown) for the associated vehicle in order to supply or discharge the air in the bottom box 34 and between the fins 112.

In the latter configuration, it is possible to improve further the cooling of the fins 112 by providing a guide wall (not shown) composed for example of an attached metal sheet extending above the ends of the fins 112 in order to guide the air flow between the fins 112.

It will be understood that, whatever the embodiment envisaged, it is essential for the heat given off by the storage units 20 to be able to be transmitted to the box 32, and that this box may not be deformed by the said heat. To this end, whatever the embodiment envisaged, the box 32 is preferably produced by moulding an aluminium alloy.

Finally, the box 32 is preferably in particular substantially the size of a standard motor vehicle battery, in order to allow the installation of the device 10 in place of a conventional battery, firstly in the case of the adaptation of a vehicle with a thermal engine to an electric and/or hybrid drive, and secondly to limit the size and weight of such a device, in order to satisfy anti-collision safety standards.

The invention therefore proposes an electrical supply device for a motor vehicle that is both compact and innovative.

This compact solution thus makes it possible to reduce connection inductances (in particular between the inverter and the DC to DC converter, or between the inverter and the supercapacitors), which produce voltage ripples and resonance between the various components and earth shifting for the signals to be communicated between the various items of equipment.

Reducing the connection inductances also reduces the phenomenon of avalanche at the inverter, a phenomenon well known to persons skilled in the art, which may produce thermal problems.

In addition, this compact solution avoids having the drawbacks of a dispersed design of this type of electrical supply device, a dispersed design that involves an increase in the number of electronic boxes in the vehicle, and consequently an increase in the sealing and cooling requirements for each box, and numerous problems of wiring in the vehicle and maintenance of connections.

Thus the integration and size of the storage units, the converters and the switch in the vehicle are improved, as well as their thermal and electrical behaviour during the functioning of the device.

Naturally the present invention is not limited to the example embodiments described, all combinations being possible.

For example the bottom cooling means can be air cooling means as in FIGS. 5 to 8 and the top cooling means fluid cooling means as in FIGS. 2 to 4.

A single top or bottom cooling means can be provided in association with the heat regulating material.

What is claimed is:

1. An electrical supply device for a motor vehicle, the electrical supply device mounted in the motor vehicle and connecting at least one electrical machine to a battery of the vehicle, the at least one electrical machine being able to function as an electric motor and/or as an electrical generator, the electrical supply device comprising:
    a single casing; and
    at least one electrical energy storage unit disposed in the casing;
    the casing comprising:
        a bottom part forming a box receiving the at least one electric energy storage unit, the bottom part having an open top end and comprising bottom cooling means associated with the bottom part of the casing; and
        at least one top part fitting on top of the open top end of the bottom part, the at least one top part comprising top cooling means associated with the at least one top part of the casing.

2. The electrical supply device according to claim 1, wherein the:
    bottom part receives a plurality of electric energy storage units.

3. The electrical supply device according to claim 2, further comprising at least one electronic converter arranged in the single casing.

4. The electrical supply device according to claim 3, wherein the top part of the casing receives at least one electronic control card and at least one electronic power card that includes the at least one electronic converter.

5. The electrical supply device according to claim 2, wherein the bottom part is in the form of a first box, open at a top end thereof, which receives the electrical energy storage units connected in series, and which comprises the bottom cooling means; and wherein the first box has substantially the form of a parallelepiped.

6. An electrical supply device for a motor vehicle, the electrical supply device mounted in the motor vehicle and connecting at least one electrical machine to a battery of the vehicle, the at least one electrical machine being able to function as an electric motor and/or as an electrical generator, the electrical supply device comprising:
    a single casing;
    a plurality of electric energy storage units disposed in the casing; and
    at least one electronic converter arranged in the single casing;
    the casing comprising:
        a bottom part forming a box receiving the at least one electric energy storage unit, the bottom part having an open top end and comprising bottom cooling means associated with the bottom part of the casing; and
        at least one to art fitting on top of the open top end of the bottom part, the at least one top part comprising top cooling means associated with the at least one top part of the casing;
    the bottom part is in the form of a first box, open at a top end thereof, receiving the electrical energy storage units connected in series and comprising the bottom cooling means;
    the first box having substantially the form of a parallelepiped;
    the energy storage units disposed in stages such that the units in a first stage being offset with respect to a second stage so that two units in the second stage are in tangential contact with the same unit in the first stage.

7. An electrical supply device for a motor vehicle, the electrical supply device mounted in the motor vehicle and connecting at least one electrical machine to a battery of the vehicle, the at least one electrical machine being able to function as an electric motor and/or as an electrical generator, the electrical supply device comprising:
    a single casing;
    a plurality of electric energy storage units disposed in the casing; and
    at least one electronic converter arranged in the single casing;
    the casing comprising:
        a bottom part forming a box receiving the at least one electric energy storage unit, the bottom part having an open top end and comprising bottom cooling means associated with the bottom part of the casing; and
        at least one top part fitting on top of the open top end of the bottom part, the at least one top part comprising top cooling means associated with the at least one top part of the casing;
    the top part of the casing receiving at least one electronic control card and at least one electronic power card including the at least one electronic converter;
    the top part comprising a second box fitting on top of the top end of the first box and a cover fitting on the top end of the second box and comprising the top cooling means; and wherein the second box being open at its top end to receive the electronic control card, an insulation seal, the electronic power card comprising the electronic converter.

8. The electrical supply device according to claim 7, wherein at least one of the bottom cooling means and the top cooling means are fluid cooling means.

9. The electrical supply device according to claim 1, wherein the at least one electrical energy storage unit is embedded in a heat regulating material.

10. The electrical supply device according to claim 8, wherein the first box of the bottom part comprises longitudinal walls including a plurality of longitudinal conduits arranged in the thickness of the longitudinal walls of the first box, the longitudinal conduits are provided for passing a cooling fluid therethrough, and vertical transverse walls each including a cavity formed in the thickness of the vertical transverse walls; wherein the cavity communicates with at least one of
    all the associated ends of the conduits in the longitudinal walls and
    a first conduit for supplying or discharging cooling liquid, a nozzle of which projects on an external face of each of the transverse walls; and wherein the longitudinal conduits and the cavities form the bottom cooling means.

11. The electrical supply device according to claim 10, wherein the cover of the top part comprises a longitudinal and transverse cavity arranged in the thickness of the cover of the top part, the longitudinal and transverse cavity are provided for passing the cooling fluid therethrough; wherein the longitudinal and transverse cavity communicates at its ends with second conduits for supplying and discharging the cooling fluid; and wherein the longitudinal and transverse cavity forms the top cooling means.

12. The electrical supply device according to claim 11, wherein each cavity in each transverse wall of the first box of the bottom part communicates with a third conduit that communicates with the second conduit in the cover of the top part, to allow unique supply and discharge of the longitudinal conduits of the bottom part and the cavity of the cover by means of the nozzle of the bottom part.

13. The electrical supply device according to claim 12, wherein the third conduit communicates with the second conduit by means of a tube.

14. The electrical supply device according to claim 13, wherein the tube is independent and that it is received firstly directly in a bore in the first box forming the third conduit and secondly in a sleeve made from elastomer material received in a bore in the cover forming the second conduit, in particular in order to ensure impermeability to the pressurised cooling liquid.

15. The electrical supply device according to claim 7, wherein at least one of the bottom cooling means and the top cooling means are air cooling means.

16. The electrical supply device according to claim 15, wherein, in order to form the bottom cooling means, the first box of the bottom part comprises opposite transverse walls each comprising an air passage, the opposite air passages allowing an air flow to pass through the first box in order to cool the energy storage units connected in series; and wherein at least one air passage in one of the transverse walls is composed of an opening formed in the transverse wall to which an air circulation bell is abutted, an internal cavity of the air circulation bell receives internally at least one power fan and an external conduit of the air circulation bell is connected to a fresh air inlet conduit of the associated vehicle.

17. The electrical supply device according to claim 16, wherein, in order to form the top cooling means, the cover of the second box of the top part comprises a plurality of fins; and wherein at least one edge of the internal cavity of the air circulation bell projects at top ends of the fins to allow an air flow to at least partially pass over the fins.

18. The electrical supply device according to claim 17, further comprising a flap projecting horizontally from the second box; the flap extends inside the cavity of the air circulation bell in order to guide the air between the power fan and the fins.

19. The electrical supply device according to claim 16, wherein only one of the air passages in the transverse walls receives the air circulation bell; and wherein the opposite transverse wall comprises an air discharge grille.

20. The electrical supply device according to claim 16, wherein the two air passages in the opposite transverse walls are each composed of an opening to which the air circulation bell is abutted that is provided with at least one power fan respectively blowing or sucking, one edge of the internal cavity of each air circulation bell extending opposite the fins and an external conduit is connected to a fresh-air inlet or hot-air discharge conduit of the associated vehicle in order to supply or discharge the air in the bottom box and between the fins.

21. The electrical supply device according to claim 20, further comprising a guide wall that extends above the ends of the fins in order to guide the air flow between the fins.

\* \* \* \* \*